United States Patent Office 3,370,082
Patented Feb. 20, 1968

3,370,082
PURIFICATION OF ADIPODINITRILE
Karl Eisfeld, Ludwigshafen (Rhine), Peter Haug, Bad Durkheim, Heinrich Scholz, Ludwigshafen (Rhine), and Anton Wegerich, Limburgerhof, Pfalz, Germany, assignors to Badische Anilin- & Soda-Fabrik Aktiengesellschaft, Ludwigshafen (Rhine), Germany
No Drawing. Filed Aug. 13, 1964, Ser. No. 389,488
Claims priority, application Germany, Aug. 17, 1963, B 73,156
6 Claims. (Cl. 260—465.8)

This invention relates to a new process for the purification of adipodinitrile that has been prepared by conventional methods.

Adipodinitrile, whether prepared from adipic acid and ammonia, or from 1,4-dichlorobutane and sodium cyanide, or by reductive dimerization of acrylonitrile, or in some other way, is purified by distillation at subatmospheric pressure in all prior art methods. For careful purification it is necessary either to use a multistage distillation or to use columns having a large number of trays and high reflux ratios. It is therefore unavoidable that the adipodinitrile should be at high temperature for prolonged periods and losses occur by isomerization, dimerization and other reactions as well as decomposition. This difficulty in distillation may be lessened somewhat by chemical pretreatment of the adipodinitrile to be distilled, but such a method is cumbersome and attended by further losses in yield.

We have now found that adipodinitrile can be purified very advantageously by cooling or heating it to such an extent in a crystallization zone that a suspension of finely divided solid adipodinitrile in liquid adipodinitrile is formed and separating this mixture by conventional methods for solids-liquid separation, the solid adipodinitrile separated being washed with a wash liquid and the separated liquid adipodinitrile, optionally together with the wash liquid, being recirculated back to the crystallization zone or the crystallization and separating steps being repeated in one or more further crystallizing zones.

It is naturally already known in principle that it is possible to recrystallize from a melt because normally the crystals have a different composition from the surrounding melt. In spite of this, methods on this basis have only found use on a large scale in a few particularly favorable cases because often the purification effect achieved is unsatisfactory or the method is too cumbersome. The principle is known, for example, in concentrating fruit juices by partially freezing out water. In this case however the main objective is enrichment of the residual melt, and fine purification of the crystals is not the primary intention. In the similarly known recovery of fresh water from the sea by crystallization, the method principally revolves around the partial separation of a few inorganic salts from the water down to a definite residual content. Similarly, in the known isolation of p-zylene from a mixture of $C_8$ isomers by crystallization, the main purpose is to remove a few components, namely ethylbenzene, o-xylene and m-xylene, whose melting point diagrams are compared with p-xylene, down to residual contents of the order of about 1 to 2%. Certain separation methods for natural fatty acids are also based on partial crystallization of melts. Fine purification is not usually achieved in this way.

In contrast to this, adipodinitrile is obtained by the process according to this invention in a purity such as hitherto required very high expenditure for distillation equipment or by combining various separation methods. This result is surprising because with the multiplicity of possible impurities, some of them not known, it would have been expected that one or other of the troublesome components would be included within the adipodinitrile crystal and could not be adequately separated in a small number of crystallization stages, and in the art for example in U.S. patent specification No. 2,920,099 the opinion is put forward that adipodinitrile cannot, or cannot directly, be freed from its impurities by recrystallization.

The initial dinitrile containing small amounts of impurities may have been prepared by any prior art method. Adipodinitrile which has been obtained from 1,4-dichlorobutane and an alkali metal cyanide or from adipic acid and ammonia at elevated temperature in contact with water-eliminating catalysts or by hydrogenating dimerization of acrylonitrile by means of sodium amalgam or electrolytically may be used equally with adipodinitrile which has been prepared by hydrogenation of dihydromucononitrile. Examples of the impurities are particularly 2-cyanocyclopentanimine-(1) and cyanovaleramide, although a number of other compounds, especially unknown compounds, also account for the decrease in melting point in the initial adipodinitrile.

Obviously, preliminary purification of the adipodinitrile may be carried out by prior art methods, for example by treatment with acids, acid salts, for example sodium bisulfate, or with oxidizing agents, for example sodium bisulfate, potassium permanganate, or absorption agents, for example active carbon or aluminum oxide or silica gel, and also by ion exchangers, treatment with bisulfate and subsequent separation of the solid residue or a simple distillation, so that impurities which boil at a lower or higher temperature than adipodinitrile and non-distallable products are removed.

To carry out the process according to this invention, the adipodinitrile is either cooled or heated until a suspension of finely divided solid adipodinitrile in liquid adipodinitrile is obtained. This is achieved for example by cooling liquid adipodinitrile which has advantageously been precooled to a temperature 1° to 2° C. above the melting point of adipodinitrile (2.55° C.) and which has if necessary been filtered, by the use of scraper coolers, evaporator crystallizers, roller crystallizers or screw crystallizers, or by heating fully solidified adipodinitrile and mechanical size reduction, for example by stirring. It is possible to use indirect cooling, for example, cooling spirals, cooled plates or tubular coolers, or direct cooling, for example by evaporation of a solvent which preferably is immiscible or substantially immiscible with adipodinitrile. Especially suitable solvents are low-boiling hydrocarbons, i.e., hydrocarbons boiling below +2.6° C., or mixtures thereof. Examples are ethane, ethylene, propane, propylene, butane and butylene. Pentane is also suitable, but requires the use of slight subatmospheric pressure. Halogenated hydrocarbons may also be used, for example methyl chloride, ethyl chloride and methylene chloride, the latter at subatmospheric pressure. Liquid or solid carbon dioxide may also be used for direct cooling. The process is especially simple and reliable when superatmospheric pressure is used, for example 0.1 to 40, preferably 0.1 to 5, atmospheres gauge. To avoid supercooling the liquid adipodinitrile melt, it is advantageous to add solid crystals of adipodinitrile.

It is advantageous to allow crystallization of fusion to proceed to such an extent that the ratio between solid and liquid phases is about 0.05 to 2. The ratio which is preferred will depend mainly on the separation apparatus used. In general crystal mashes having 10 to 50%, particularly 20 to 40%, by weight solid content are used.

To achieve well formed crystals it is often advantageous to allow the crystal mash to remain for a long period, for example one to five hours, at the crystallization temperature, either in the crystallization vessel itself or in a separate container.

The particle size sought after in the suspension depends on the separation method or separation unit. In general, particles having average diameters of 0.1 to 1, particularly from 0.2 to 0.5 mm. may be separated well and if desired washed well. Preparation of the crystal suspension is effected at a temperature lower than 2.6° C., the lower temperature limit depending on the impurities present. Since the use of adipodinitrile having a melting point of more than +1° C. as initial material is preferred, the lower temperature limit is in general at about −10° C. depending on the ratio of the amount of pure crystalline product to the amount of residual melt. In individual cases, however, temperatures may be used which are a few degrees lower. If eutectics are present, the composition of the initial material must fall within the range of the melting point diagram in which adipodinitrile crystals are separated on cooling. If necessary, such a composition must be produced by means of other purification methods.

Separation may be carried out by using any prior art separation equipment, for example filter presses, vacuum filters, pressure filters, or centrifuges of various designs. It is preferred to use separation apparatus in which it is possible to wash the separated product and also those in which it is possible to decrease the residual moisture by the use of pressure.

The mother liquor adhering to the separated crystals is advantageously displaced by a suitable wash liquid, for example low boiling point substances, i.e., substances boiling below 200° C., which may be miscible or immiscible with adipodinitrile but should not react therewith, such as alkanes or alkane mixtures, especially those having 4 to 10 carbon atoms, cycloalkanes having 5 to 10 carbon atoms, aromatic or arylaraliphatic hydrocarbons having 6 to 10 carbon atoms, e.g., octane, butane, pentane, hexane, cyclohexane, cyclooctane, benzene, toluene, xylene or low-boiling alkanols, especially those having 1 to 8 carbon atoms, e.g., methanol, ethanol, propanols, butanols, hexanols, octanols, dialkylketones, especially those having 3 to 9 carbon atoms, e.g., acetone, methyl ethyl ketone, diethyl ketone, diisopropyl ketone, dibutyl ketone or open or cyclic ethers, especially those with 2 to 4 carbon atoms, e.g., diethyl ether, tetrahydrofuran and dioxane. Halogenated hydrocarbons, e.g. methyl chloride, methylene chloride, chloroform, carbon tetrachloride, trichloroethylene, chlorobenzene, bromobenzene or dichlorobenzenes, or esters, especially of lower fatty acids with lower alcohols, e.g., methyl acetate, ethyl acetate, butyl acetate, ethyl propionate, butyl propionate, methyl butyrate or ethyl butyrate and even water may also be used for washing. It is, however, more advantageous to effect displacement with pure adipodinitrile which has been obtained for example from a previous batch by melting the crystals. Washing of the crystals may be carried out in a separate mashing container, the wash liquid normally being used appropriately cooled; it is however more advantageous to wash on the separation apparatus itself, for example on a pressure or vacuum filter or a pusher centrifuge. A particularly simple and effective embodiment consists in recovering the liquid used in washing by partial melting of the separated crystals, i.e. the crystals are first separated, adherent mother liquor is separated as far as possible and the crystals are then melted to such an extent by heating, for example by supplying hot air or by irradiation, that the amount provided for washing is liquefied. If adipodinitrile is used for washing it is advantageous to use less solvent than the amount of solid adipodinitrile. Ratios by weight of from 1:2 to 1:10, preferably from 1:3 to 1:5, have proved useful. When using other solvents, similar and also higher ratios, for example up to 1:1, have been found to give good results.

The purity of the initial material determines whether an adipodinitrile which satisfies all requirements as to purity is obtained by a single crystallization or whether the solid adipodinitrile will have to be subjected one or more times to the same purification process.

The liquid product obtained when the solid adipodinitrile has been separated may either be supplied to a classic distillation or subjected to a classic purification process consisting in a chemical treatment, for example with mineral acids, especially sulfuric acid, or organic acids, or acid salts of such acids, e.g., potassium or sodium hydrogen sulfate or, more advantageously, recycled to the crystallization zone or again partly crystallized in a further stage. When operating continuously, obviously such an amount of liquid contaminated adipodinitrile must be withdrawn from the single or multistage crystallization that the impurities supplied to the process are removed.

The wash liquid obtained by washing the crystals should be collected separately when an extraneous washing agent is used. This must then be recovered. In the preferred embodiment which uses pure adipodinitrile for the washing, the washing filtrate may be used like the filtrate originally obtained.

Adipodinitrile can be brought to very high purity by the new purification process without difficulty. For example, adipodinitrile having a melting point of 2.4° C. can be obtained without losses occurring owing to secondary reactions, whereas in the case of distillations leading to an equivalent purity, unavoidable losses occur by secondary reactions.

The invention is further illustrated by the following examples.

Example 1

1000 g. of adipodinitrile obtained from adipic acid and ammonia which has a melting point of +1° C., is about 95% purity and is colored dark brown is partly frozen in a beaker cooled with solid carbon dioxide and acetone until about half has solidified and a thick crystal mash is formed by stirring with a spatula. The mash is placed on a suction filter cooled to about 2° C. and the mother liquor (about 550 g.) is sucked off under slight mechanical pressure. Part of the crystallizate (about 150 g.) is melted at the upper side of the cake of crystals and also sucked away. 300 g. of adipodinitrile remains on the suction filter. In the molten state this is colorless and after having been dried in vacuo has a melting point of 2.4° C. The crystallization process is repeated with the adipodinitrile which has remained liquid, until 90% by weight of the adipodinitrile originally present has been separated in pure form. Part of the remaining 10% may be recovered by distillation.

Example 2

A crystallizer having a rotating internally cooled roller has continuously supplied to it a 97% crude adipodinitrile (melting point about 1.5° C.). By a brine coolant at −15° C., a solids concentration of about 40% is maintained in the crystallizer. The crystal mash withdrawn is continuously separated into crystalline product and mother liquor on a two-stage pusher centrifuge cooled to 0° C. The crystalline product is washed on the centrifuge with about one quarter of its amount of molten pure adipodinitrile and the wash liquid and part of the mother liquor are returned to the crystallizer. The washed crystalline product and the residual mother liquor (about 80 and 20% of the amount of liquid supplied) is withdrawn. The crystalline solid is almost colorless and has a purity of more than 99.9% according to gas chromatographic analysis. 10% of the adipodinitrile originally present can be enriched in the withdrawn mother liquor by a simple distillation so that the distillate is equivalent in composition to the original initial material.

Example 3

Liquid crude adipodinitrile which is dark colored and contains about 0.6% by weight of cyanocyclopentanimine besides other impurities is placed in a glass flask fitted with a stirrer. The substance is intensely stirred and liquid propane constantly dripped onto its surface in such an amount that sufficient heat is removed from the acrylonitrile by evaporation of the propane that a crystal mash is formed in the flask after a short time. When the mash is fairly viscous and contains approximately 40% of solid constituents, the supply of propane is stopped and stirring continued for about half an hour. The crystal mash is treated in a basket centrifuge at an initial temperature of approximately 0° C., deeply dark mother liquor running away following by increasingly lighter fractions due to melting crystals. After about half of the crystalline solid has molten and been centrifuged, the remaining crystals are white. In the liquid state, the product is nearly colorless. The content of cyanocyclopentanimine is less than 0.01% by weight.

*Example 4*

Liquid adipodinitrile of the same grade as used in Example 3 is placed in an outfit as described in Example 3. Then n-pentane is introduced in such an amount that at a pressure of 150 mm. Hg the vaporizing solvent abstracts sufficient water from the adipodinitrile for a crystal mash to be formed in the flask. The mash is treated as described in Example 3. On completion of crystallization the mother liquor is filtered off on a frit cooled to about 0° C. and the remaining crystalline product washed several times, each time with a quarter of its own amount of liquid pentane at about 0° C. The remaining crystals contain less than 0.01% by weight of cyanocyclopentanimine.

We claim:

1. A process for the purification of a crude adipodinitrile consisting predominately of adipodinitrile which comprises cooling said crude adipodinitrile as a liquid in a crystallization zone maintained at a temperature of about −10° C. up to +2.6° C., forming in said crystallization zone a suspension of finely divided solid adipodinitrile in liquid adipodinitrile in which the weight ratio of the solid phase to the liquid phase is about 0.05:1 to 2:1, separating the solid phase from the liquid phase, washing the resulting separated solid adipodinitrile and withdrawing the washed adipodinitrile as a purified product.

2. A process as claimed in claim 1 wherein said separated solid adipodinitrile is washed with liquid purified adipodinitrile obtained by melting a portion of the purified product.

3. A process as clamed in claim 1 wherein said separated solid adipodinitrile is washed with an inert solvent.

4. A process as claimed in claim 1 wherein liquid adipodinitrile is recirculated to said crystallization zone.

5. A process as claimed in claim 1 wherein said purification treatment using liquid adipodinitrile is repeated in at least one additional crystallization zone.

6. A process as claimed in claim 1 wherein said crude adipodinitrile in liquid form is directly cooled in said crystallization zone by adding thereto an inert substance having a boiling point below +2.6° C. and evaporating said inert substance therefrom at a pressure of about 0.1 to 40 atmospheres gauge.

References Cited

UNITED STATES PATENTS 2,920,099   1/1960   Ringwald _____ 260—465.8

JOSEPH P. BRUST, *Primary Examiner.*